United States Patent [19]
Cloke

[11] 3,891,840
[45] June 24, 1975

[54] LOW LEAKAGE CURRENT INTEGRATOR
[75] Inventor: Robert L. Cloke, Santa Clara, Calif.
[73] Assignee: Information Storage Systems, Inc., Cupertino, Calif.
[22] Filed: Dec. 14, 1973
[21] Appl. No.: 424,841

[52] U.S. Cl. .................... 235/183; 307/246; 320/1; 328/127
[51] Int. Cl. ............................................. G06g 7/18
[58] Field of Search ......... 235/183; 320/1; 328/127; 307/246, 294

[56] References Cited
UNITED STATES PATENTS

| | | |
|---|---|---|
| 2,999,968 | 9/1961 | Weiss .................................... 320/1 |
| 3,197,690 | 7/1965 | Ball ....................................... 320/1 |
| 3,211,984 | 10/1965 | Jones ..................................... 320/1 |
| 3,309,618 | 3/1967 | Harris et al. ...................... 320/1 X |
| 3,521,141 | 7/1970 | Walton ................................. 320/1 |

Primary Examiner—Joseph F. Ruggiero
Attorney, Agent, or Firm—Gerald L. Moore

[57] ABSTRACT

A current integrator for performing the function $$V = \frac{1}{C} \int (I_+ - I_-) \, dt$$

having very low current leakage.

1 Claim, 2 Drawing Figures

LOW LEAKAGE CURRENT INTEGRATOR

CROSS REFERENCE TO RELATED APPLICATION

This invention relates to a current integrator of the type used in circuits such as that shown and described in U.S. Pat. application Ser. No. 421,211, entitled SYNCHRONIZATION OF MULTIPLE DISC DRIVES, filed on Dec. 23, 1973, and assigned to the present assignee.

BACKGROUND OF THE INVENTION

Current integrators of the type performing the function $$V = \frac{1}{C} \int (I_+ - I_-) \, dt$$

are used in circuits to derive a voltage signal which is the integral of the difference between two electric currents. One example of the use for such circuits is shown in the previously identified patent application wherein there is a need to generate a voltage signal which is ramped positive and negative as a result of two current flows indicating signals derived from the relative positions of two moveable members. In this example, the voltage signal is utilized to reset the speed of one moveable member thereby shifting the position of that moveable member relative to the other member in a manner to bring synchronization to the movement of the members. While many other uses for such circuits are known, this use is one example in which the subject invention can be used.

In order for such circuits to be effective in deriving signals responsive to the difference between two electric currents, there must be a limited current leakage within the circuit because any current leakage directly affects the output signal by offsetting it by the value of the leakage current. This is obvious since the ultimate signal is derived from an electric current and such internal current leakage affects the value of that current flow.

Such prior devices generally appear as is shown in FIG. 1 of the drawing. As can be seen from that drawing, the signal V across the terminals is dependent upon the charge on the capacitor C. The capacitor charge is dependent upon the integral, or history of the difference between the currents $I_+$ and $I_-$. However, any current leakage within the circuit will add to or, in the usual case, subtract from the charge on the capacitor C such that the charge will be affected and thereby making the output signal V not a true indication of the difference between the current flow.

In past device, the leakage has been due in very small part to the capacitor since very high quality capacitors are available. Additionally the output signal V or voltage measuring device can be designed to present very small current leakage. However, experience has shown that past circuits have suffered from the fact that there existed a substantial current leakage. The leakage occurred not only during the periods of current conduction, but also at the times when no input or output current was being conducted. For these reasons, it has been found that past current integrators have been less than efficient in the generation of a correct output signal and it is the purpose of this invention to provide a low leakage current integrator of the type heretofore described.

SUMMARY OF THE INVENTION

A current integrator comprising a capacitor, current isolation means connecting a first capacitor terminal to a first output terminal, second terminal means connecting with the second capacitor terminal, first and second transistors having the collectors interconnected with one terminal of the capacitor, circuit means connecting the bases of the first and second transistors to the first output terminal, and one input terminal connecting with each transistor emitter whereby current received at the emitter of the first transistor charges the capacitor and current transmitted by the second transistor will discharge the capacitor thereby making the voltage signal at the integrator output terminals the integral of the current flow through the transistors.

DESCRIPTION OF THE INVENTION

Figure 1:
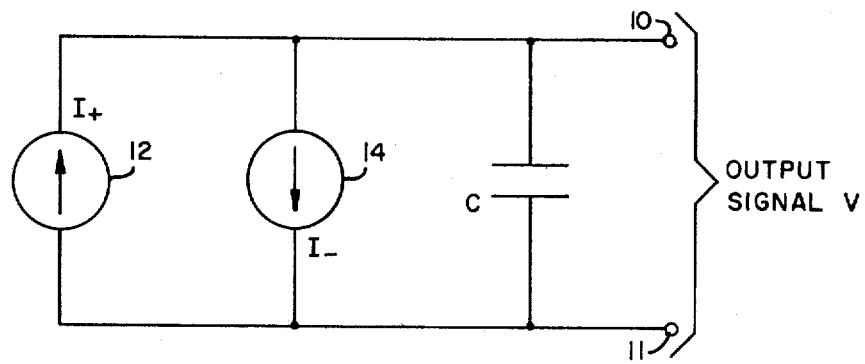
FIG. 1 shows a prior art current integrator.

In FIG. 1 there is shown in schematic form, a typical prior art current integrator comprising a capacitor C serving as a charge accumulation means with the terminals thereof connected to the terminals 10 and 11 across which the output signal is read in the form of a voltage V.

The purpose of the circuit is to generate the voltage V in accordance with the following mathematical function:

$$V = \frac{1}{C} \int (I_+ - I_-) \, dt$$

Thus, there is provided the current sources 12 and 14 for providing the currents $I_+$ and $I_-$ respectively to the capacitor C for the purpose of charging or discharging the capacitor at a rate determined by the magnitude of the currents and for a time duration depending upon the period of current flow known as dt.

Where it not for imperfections in the electronic components of circuits such as the one just described, the circuit would perform the mathematical function exactly. However, prior experience has shown that while capacitors can be made to substantially eliminate current leakage, there has existed current leakage in the current sources 12 and 14 both during the time of current flow and during the period when current is not desired to flow. For these reasons, such circuits in the past have been found not to generate an output signal V directly dependent upon the mathematical function heretofore described.

Figure 2:
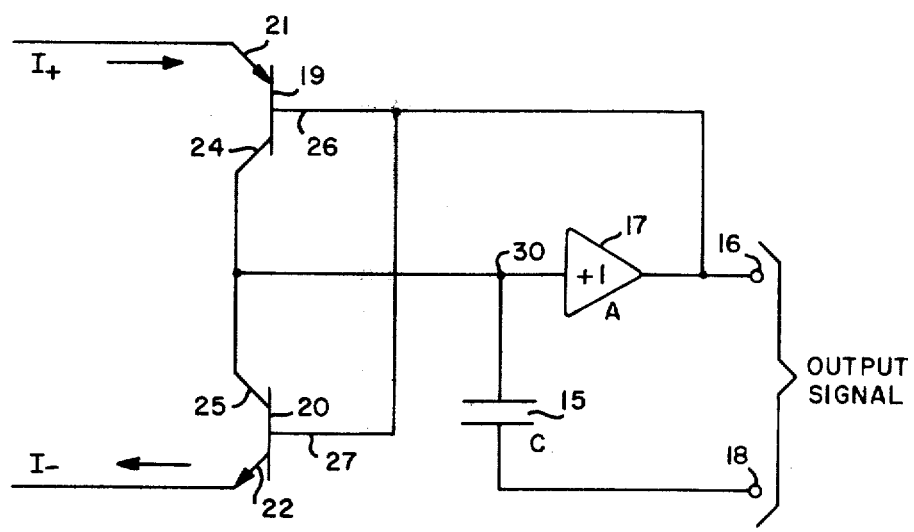
FIG. 2 shows one embodiment of the present invention.

In accordance with the present invention there is provided the circuit of FIG. 2 comprising a capacitor 15 serving as a charge accumulation means. Connected to the terminal 16 of the capacitor is a current isolation means 17 preferably comprising an isolation amplifier having unity voltage gain and used to eliminate a loading effect of a measuring device serving to measure the output signal across the terminals 16 and 18. Thus, the isolation amplifier will have a negligible input current if designed with a high input impedance device such as a field effect transistor and particularly those of the metal-oxide-semiconductor variety which are commonly used today.

As previously pointed out, such current integrators are designed to generate a signal responsive to the integral of the mathematical formula previously discussed. The value of such circuits depends upon the ability of the circuits to perform while having a low current leakage in the components. Thus, there are provided the transistors 19 and 20 having emittors 21 and 22 respectively for transmitting to the capacitor 15 the current $I_+$ and transmitting away from the capacitor 15 the current $I_-$, respectively. The transistor 19 is of the p-n-p type while the transistor 20 is the n-p-n type. The collectors 24 and 25 of the transistors are electrically connected with the capacitor terminal 30 such that current flowing through the transistors in the normal manner will serve to charge and discharge the capacitor. The bases 26 and 27 are likewise interconnected with the positive output terminal 16 of the isolation amplifier.

In operation, during the quiescent stage, substantially no leakage current flows internally within the circuit because the base and collector of each transistor are of equal potential to block such leakage current. When the emitter 21 becomes positive by the initiation of current flow $I_+$ thereto, current flows from the emitter to the collector and on to the terminal 26 of the capacitor 15. This current flow serves to charge the capacitor at a rate dependent upon the magnitude of the current and to an amount dependent upon the time duration of the current flow. Thus, the charge on the capacitor is changed by an amount $I_+ dt$.

Similarly, with the occurrence of a negative current signal, $I_-$ at the emitter 22 of the transistor 20, a current $I_-$ flows from collector to emitter which serves to discharge the capacitor 15 at a rate dependent upon the magnitude of the current and for a time duration dt depending upon the length of current flow. Thus, the capacitor 15 is discharged by an amount $I_- dt$. It should be pointed out that the currents $I_+$ and $I_-$ may flow concurrently also.

It thus can be seen that the circuit just described performs the mathematical function $$V = \frac{1}{C} \int (I_+ - I_-) dt$$

while permitting substantially no internal leakage current to flow because of the relative potentials of the current sources.

That which is claimed is:

1. A current integrator capable of performing the function $1/c \int I\, dt$, said integrator comprising:

first and second integrator input terminals and first and second integrator output terminals;

a capacitor having first and second terminals;

first and second transistors with the collectors thereof interconnected with the first terminal of the capacitor;

an isolation amplifier having a gain of unity and having input and output terminals;

circuit means connecting the first terminal of the capacitor to the amplifier input terminal;

circuit means connecting the bases of the first and second transistors, the output of the amplifier and the first integrator output terminal;

circuit means connecting the capacitor second terminal with the second integrator output terminal;

circuit means connecting the first and second integrator input terminals to the first and second transistor collectors respectively whereby electric current transmitted to the integrator input terminals will result in a voltage signal at the integrator output terminals which is the integral of the differences in the current received at the integrator input terminals.

* * * * *